(12) United States Patent
Karppanen (10) Patent No.: US 10,127,210 B1
(45) Date of Patent: Nov. 13, 2018

(54) CONTENT RENDERING

(71) Applicant: Amazon Technologies, Inc., Seattle, WA (US)

(72) Inventor: Jari Juhani Karppanen, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 125 days.

(21) Appl. No.: 14/866,564

(22) Filed: Sep. 25, 2015

(51) Int. Cl.
*G06F 17/00* (2006.01)
*G06F 17/22* (2006.01)

(52) U.S. Cl.
CPC ........ *G06F 17/227* (2013.01); *G06F 17/2205* (2013.01); *G06F 17/2247* (2013.01)

(58) Field of Classification Search
CPC .. G06F 3/04845; G06F 21/629; G06F 17/211; G06F 17/2247
USPC ................................ 715/204, 234, 240, 243
See application file for complete search history.

(56) References Cited

U.S. PATENT DOCUMENTS

| | | | |
|---|---|---|---|
| 5,828,370 | A | 10/1998 | Moeller |
| 7,191,467 | B1 | 3/2007 | Dujari et al. |
| 7,512,932 | B2 | 3/2009 | Davidov et al. |
| 7,627,814 | B1 | 12/2009 | Soldan et al. |
| 8,510,237 | B2 | 8/2013 | Cascaval |
| 8,555,157 | B1 | 10/2013 | Fu |
| 8,799,412 | B2 | 8/2014 | Trahan |
| 9,167,054 | B2 | 10/2015 | Trahan et al. |
| 9,292,367 | B2 | 3/2016 | Mickens |
| 9,383,932 | B2 * | 7/2016 | Das Sharma ......... G06F 3/0619 |
| 9,509,783 | B1 | 11/2016 | Hayden |
| 9,749,202 | B1 | 8/2017 | Jain et al. |
| 9,811,321 | B1 | 11/2017 | Karppanen |
| 2002/0009078 | A1 | 1/2002 | Wilson et al. |
| 2002/0013833 | A1 | 1/2002 | Wyatt et al. |

(Continued)

OTHER PUBLICATIONS

Allen, M., HydrateJS by nanodeath, Dec. 14, 2013, http://nanodeath.gihub.io/HydrateJS/.

(Continued)

*Primary Examiner* — Stephen S Hong
*Assistant Examiner* — Matthew J Ludwig
(74) *Attorney, Agent, or Firm* — Knobbe, Martens, Olson & Bear, LLP (57) ABSTRACT

Systems and methods are described for implementing an improved rendering engine for rendering network content that utilizes a shared memory block. A client computing device executes a browser software application that generates a document object model ("DOM") tree. The improved rendering engine analyzes the DOM tree and identifies repeating patterns of nodes or branches whose content is rendered to a separate memory block. The improved rendering engine generates a shared memory block for the repeating nodes and implements a separate drawing space for each node on the shared memory block. Each node on the shared memory block may have a coordinate translation function to relate the node position on the shared memory block to a corresponding position in a composite memory block. Additionally, transformations and filters may be applied to the shared memory block as a whole, rather than applying them to the nodes individually.

19 Claims, 7 Drawing Sheets

(56) References Cited

U.S. PATENT DOCUMENTS

| | | | |
|---|---|---|---|
| 2002/0133627 A1* | 9/2002 | Maes | G06F 17/30905 709/246 |
| 2002/0147788 A1 | 10/2002 | Nguyen | |
| 2003/0014478 A1 | 1/2003 | Noble | |
| 2003/0055610 A1 | 3/2003 | Webber | |
| 2004/0015476 A1 | 1/2004 | Twaddle | |
| 2004/0230903 A1 | 11/2004 | Elza et al. | |
| 2005/0198365 A1 | 9/2005 | Wei | |
| 2006/0136552 A1 | 6/2006 | Krane et al. | |
| 2006/0168101 A1 | 7/2006 | Mikhailov et al. | |
| 2007/0005622 A1 | 1/2007 | Fernandes et al. | |
| 2007/0192329 A1 | 8/2007 | Croft et al. | |
| 2008/0139191 A1 | 6/2008 | Melnyk | |
| 2008/0313206 A1 | 12/2008 | Kordun et al. | |
| 2009/0168760 A1 | 7/2009 | Katis et al. | |
| 2009/0202159 A1 | 8/2009 | Ström | |
| 2009/0210631 A1 | 8/2009 | Bosworth et al. | |
| 2009/0319776 A1 | 12/2009 | Burch et al. | |
| 2010/0005053 A1 | 1/2010 | Estes | |
| 2010/0077444 A1 | 3/2010 | Forristal | |
| 2010/0313189 A1 | 12/2010 | Beretta et al. | |
| 2011/0015917 A1 | 1/2011 | Wang et al. | |
| 2011/0145360 A1 | 6/2011 | Sheshagiri et al. | |
| 2011/0258532 A1* | 10/2011 | Ceze | G06F 17/30902 715/234 |
| 2012/0066380 A1 | 3/2012 | Gao et al. | |
| 2012/0173966 A1 | 7/2012 | Powell et al. | |
| 2012/0260157 A1 | 10/2012 | Zhu et al. | |
| 2012/0330984 A1 | 12/2012 | Fablet et al. | |
| 2012/0331228 A1 | 12/2012 | Shatz | |
| 2013/0007100 A1 | 1/2013 | Trahan | |
| 2013/0031459 A1 | 1/2013 | Khorashadi et al. | |
| 2013/0058414 A1 | 3/2013 | Tsuru | |
| 2013/0067086 A1 | 3/2013 | Hershko et al. | |
| 2013/0246906 A1 | 9/2013 | Hamon | |
| 2014/0033019 A1 | 1/2014 | Zhang | |
| 2014/0052702 A1 | 2/2014 | Fierro et al. | |
| 2014/0053064 A1* | 2/2014 | Weber | G06F 17/2247 715/235 |
| 2014/0281918 A1 | 9/2014 | Wei et al. | |
| 2015/0026566 A1 | 1/2015 | Hui | |
| 2015/0052596 A1 | 2/2015 | Ayanam | |
| 2015/0089352 A1 | 3/2015 | Conboy et al. | |
| 2015/0205761 A1 | 7/2015 | Shah | |
| 2015/0271188 A1 | 9/2015 | Call | |
| 2016/0057220 A1* | 2/2016 | Gibbs | G06F 8/65 709/203 |
| 2016/0142914 A1 | 5/2016 | He et al. | |
| 2016/0205088 A1 | 7/2016 | Sreesha et al. | |

OTHER PUBLICATIONS

Gross, R., and A. Wightman, MarioNet Split Web Browser, p. 1, Jan. 1999, https://en.wikipedia.org/wiki/MarioNet_split_web_browser.

Gardiel, T., and P. Irish, How Browsers Work: Behind the Scenes of Modern Web Browsers, http:www.html5rocks.com/en/tutorials/internals/howbrowserswork/, published Aug. 5, 2011, pp. 1-62, retrieved Jun. 25, 2015.

Hickson, I., Ed., Web Storage, W3C Working Draft, Oct. 29, 2009, pp. 11-18, http://www.w3.org/TR/2009/WD-webstorage-20091029/.

Jain, A.S., and D.L.R. Batni, Remote Session Preview Management, U.S. Appl. No. 14/180,245, filed Feb. 13, 2014.

Jquery API Documentation, Feb. 10, 2010, Version 1.2, p. 162, http://api.jquery.com/serialize/.

Wellons, C., Precise JavaScript Serialization With ResurrectJS, Mar. 28, 2013, http://nullprogram.com/blog/2013/03/28/.

* cited by examiner

*PRIOR ART*

CONTENT RENDERING

BACKGROUND

Generally described, computing devices and communication networks can be utilized to exchange information. In a common application, a computing device can request content from another computing device via the communication network. For example, a user at a personal computing device can utilize a software application process, typically referred to as a browser, to request a Web page from a server computing device via the Internet. In such embodiments, the user computing device can be referred to as a client computing device, and the server computing device can be referred to as a content provider.

Once the client computing device obtains the Web page, the content may be processed in a number of stages by the software browser application or other client computing device interface. For example, the browser may parse the Web page to process various Hypertext Markup Language ("HTML") layout information and references to associated resources, may identify and process Cascading Style Sheets ("CSS") information, may process various scripts associated with the Web page, may construct a native object model to represent one or more components of the Web page, and may calculate various layout and display properties of the processed content for presentation to a user.

From the perspective of a user utilizing a client computing device, a user experience can be defined in terms of the performance and latencies associated with obtaining a Web page, processing embedded resource identifiers, executing script files, and rendering content on the client computing device. Latencies and performance limitations of any of the above processes may diminish the user experience. Additionally, latencies and inefficiencies may be especially apparent on computing devices such as netbooks, tablets, smartphones, and the like, which may have limited resources in terms of processing power, memory, or network connectivity.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Generally described, aspects of the present disclosure are directed to the processing and display of Web content by a client computing device. More specifically, aspects of the present disclosure are related to systems, methods, and computer-readable media related to consolidating document layers when rendering the content of Web pages. Rendering a web page containing several content items may be time and resource-intensive, especially if several of the content items specify rendering properties, such as transparency or 3D rotation, that necessitate rendering to a separate memory block. By identifying content items with similar rendering properties and rendering them to a single shared memory block, the time and resources required to render a Web page may be reduced. In some aspects, the time and resources required to render a Web page may be reduced by rendering content items as a group, regardless of whether they are rendered to a single shared memory block. Although various aspects of the embodiments described in the present disclosure will focus, for purposes of illustration, on rendering of Web pages by a client browser application, one skilled in the art will appreciate that the techniques disclosed herein may be applied to any number of software processes or applications. Further, although various aspects of the disclosure will be described with regard to illustrative examples and embodiments, one skilled in the art will appreciate that the disclosed embodiments and examples should not be construed as limiting.

With reference to an illustrative example, a user may cause a client computing device to load and execute a software browser application (henceforth referred to as a "browser") for accessing content provided by one or more content providers. Illustratively, the accessed content may include a collection of one or more network resources (e.g., a Web page) and embedded resources such as images, video, audio, text, executable code, and the like.

Subsequent to the browser being loaded, a user or automated browser process may cause the client computing device to transmit a request to access content from a content provider by establishing a browse session with a content provider across a private or public network. The browse session request may include information identifying one or more sources for the requested content. The identifiers can be in the form of network addresses of network resources, such as a Web site or other network accessible piece of content. For example, the user may select or enter a URL (e.g., http://www.example.com) into a browser window, causing the client computing device to transmit a request for a new browse session to the content provider, including the selected URL.

In an illustrative embodiment, the browser may receive content from the content provider in response to the request. The browser may comprise, for example, a layout engine or rendering engine that parses the received content to identify and process various elements, such as HTML layout information, CSS information, embedded objects such as images or video, or script content such as JavaScript or other source code. Illustratively, the rendering engine may parse an HTML document and create a structured organization of the various objects associated with the document, such as a document object model ("DOM"). The DOM may be represented as a tree structure, with nodes representing various elements or objects within the document. For example, nodes of the DOM tree may represent content items that are rendered and displayed to the user, such as text, images, active display elements, and the like.

The rendering engine may illustratively determine an order of rendering for the nodes of the DOM tree. In some embodiments, nodes may represent content items that would be rendered to identical or overlapping positions in the output, and the order of rendering may specify which node's content takes precedence. Nodes may illustratively be rendered to a series of layers that reflect the order of rendering, with the "front" layer taking the highest precedence, and the lower-ordered layers "behind" it presenting only those portions of content items that are not superseded by other content items. The rendering engine may determine that a node should have its own rendering layer, or may determine that a node and its parent node can be rendered on the same layer. Nodes may thus have a many-to-one correspondence with rendering layers, with each node having exactly one layer.

In some embodiments, nodes may specify properties or parameters indicating that their rendering should take precedence over other nodes. For example, nodes may specify a "Z index" parameter whose numerical value positions them in the rendering order. The rendering engine may accordingly render a node with a Z-index of 3 in front of a node with a Z-index of 2. As a further example, a node may specify a "position" property that places it in front of other nodes. The rendering order may thus vary relative to the ordering of nodes in the DOM tree. The rendering engine may further assign default positions in the rendering order (e.g., the order in which nodes appear in the document or in the DOM tree) to nodes that do not otherwise specify a position in the rendering order.

The rendering engine may illustratively organize rendering layers into a tree structure, and may assign backing surfaces to all or some of the rendering layers. Generally described, a backing surface is a block of memory that the rendering engine uses as a two-dimensional drawing surface for storing rendered content. The rendering engine thus renders one or more nodes to a rendering layer, and then stores one or more rendering layers to a backing surface. By using backing surfaces to store the content of one or more rendering layers, the rendering engine may render the content in stages, and then combine the backing surfaces to produce a composite output. The rendering engine may use various techniques, including aspects of the present disclosure, to reduce the number of backing surfaces required to produce the composite output, since each backing surface represents an additional block of memory that must be allocated and combined to produce the final output.

In an illustrated embodiment, some nodes may specify properties that cause the rendering engine to use a separate backing surface for that particular node. For example, a node may specify a CSS filter, such as grayscale or blurring, that the rendering engine applies by first rendering the content to a rendering layer, storing the layer to the backing surface, and then applying the filter to the backing surface. Because the rendering engine applies the filter to the backing surface, the backing surface cannot be shared with nodes that do not specify the filter. As a further example, a node may specify a transformation, such as changing the user's perspective or rotating the image in three dimensions, that the rendering engine similarly applies by first storing the rendered image to the backing surface and then applying the perspective change or rotation. In further embodiments, some nodes may specify properties, such as an opacity property or an animation property, that can only be rendered if the layers "beneath" the node have already been rendered. Nodes having these properties may increase the number of backing surfaces used by the rendering engine, which in turn increases memory usage and requires additional processing. By identifying such nodes and rendering them to a shared memory block, aspects of the present disclosure reduce the number of backing surfaces, and thereby reduce the amount of memory and processing required to render Web content.

In some embodiments, the rendering engine may identify that a DOM tree has multiple branches that are similar in structure. Illustratively, a document may contain a series of repeating objects, such as a gallery of images with captions and user interface elements. The corresponding DOM tree may therefore contain several sibling branches, each of which has a node that may require a separate memory block. In various aspects of the present disclosure, these separate backing surfaces may be combined into a single shared memory block, and transformations that would otherwise be separately applied to several backing surfaces may instead be applied to the single shared memory block.

In further embodiments, the rendering engine may identify nodes that have common rendering properties without regard to their position in the DOM tree. The rendering engine may then analyze the DOM tree and the rendering order to determine whether these nodes may be rendered as a group. Illustratively, nodes may be rendered as a group when none of the nodes require or depend on the rendering of another node in the same group. For example, the rendering of node 1 may depend on the rendering of nodes 2 and 3. The rendering of node 2 may depend on the rendering of node 4, the rendering of node 3 may depend on the rendering of node 4, and the rendering of node 4 may be independent of other nodes. The rendering engine may thus determine that nodes 2 and 3 can be rendered as a group, since either node can be rendered without requiring that the other be rendered first. However, nodes 1 and 4 cannot be rendered together due to the chain of dependencies between them: the rendering of node 1 depends on nodes 2 and 3, and nodes 2 and 3 both depend on node 4. The rendering engine may illustratively identify dependencies by analyzing the Z-orders of nodes.

In further embodiments, the rendering engine may generate a coordinate translation function for content items rendered to the shared backing surface, which maps their position on the shared backing surface to a position on a different backing surface. Each content item that is rendered on the shared backing surface may thus be translated to its expected position on another backing surface, thereby allowing the tree of rendering layers to be combined in the final presentation of the document.

Still further, in some embodiments, the rendering engine may render a "background" backing surface for nodes that specify transparency, opacity, or other properties that require rendering of other nodes in order to render the foreground node. The rendering engine may illustratively render nodes onto one or more backing surfaces, combine these backing surfaces, and generate a composite rendering of content items behind the foreground node. In some embodiments, the rendering engine may render the foreground node and then combine it with a background backing surface, applying transparency or other properties at the time the surfaces are combined. In other embodiments, the rendering engine may "prepare the canvas" by copying the background backing surface onto the shared backing surface, and then render the foreground node in-place on the shared backing surface.

One skilled in the art will appreciate that the examples and embodiments described herein are illustrative and not limiting. For example, a node may specify other properties that would cause the rendering engine to use a separate backing surface, such as video decoding, a 3D or accelerated 3D drawing context, a descendant or sibling that requires a separate backing surface, or a content plugin that requires its own backing surface. As a further example, the rendering engine may flatten the tree of rendering layers into an ordered list, and may determine a position within the list for rendering the shared backing surface. Still further, aspects of the present disclosure include identifying nodes that can share a backing surface independently of determinations based on DOM tree structure or rendering layer tree structure. For example, the rendering engine may identify a plurality of nodes throughout the DOM tree that all specify a particular transformation, and may render them all and apply the transformation to all these nodes at once, regardless of whether the nodes are positioned on similar branches of the DOM tree or of whether the nodes are rendered to a shared backing surface.

Still further, embodiments of the present disclosure may identify node properties that would cause the rendering engine to apply a third transformation to all or part of the shared backing surface. For example, the rendering engine may identify a set of nodes that specify a first filter (e.g., rotation), a subset of which specify a second filter (e.g., grayscale). The rendering engine may accordingly render these nodes to a shared backing surface, rotate all of them, and then apply a grayscale filter to the subset. The rendering engine may further organize the placement of nodes on the shared backing surface to facilitate applying a transformation to a subset of the nodes, and may adjust the coordinate translation functions as needed to maintain content item positions between backing surfaces.

Figure 1:
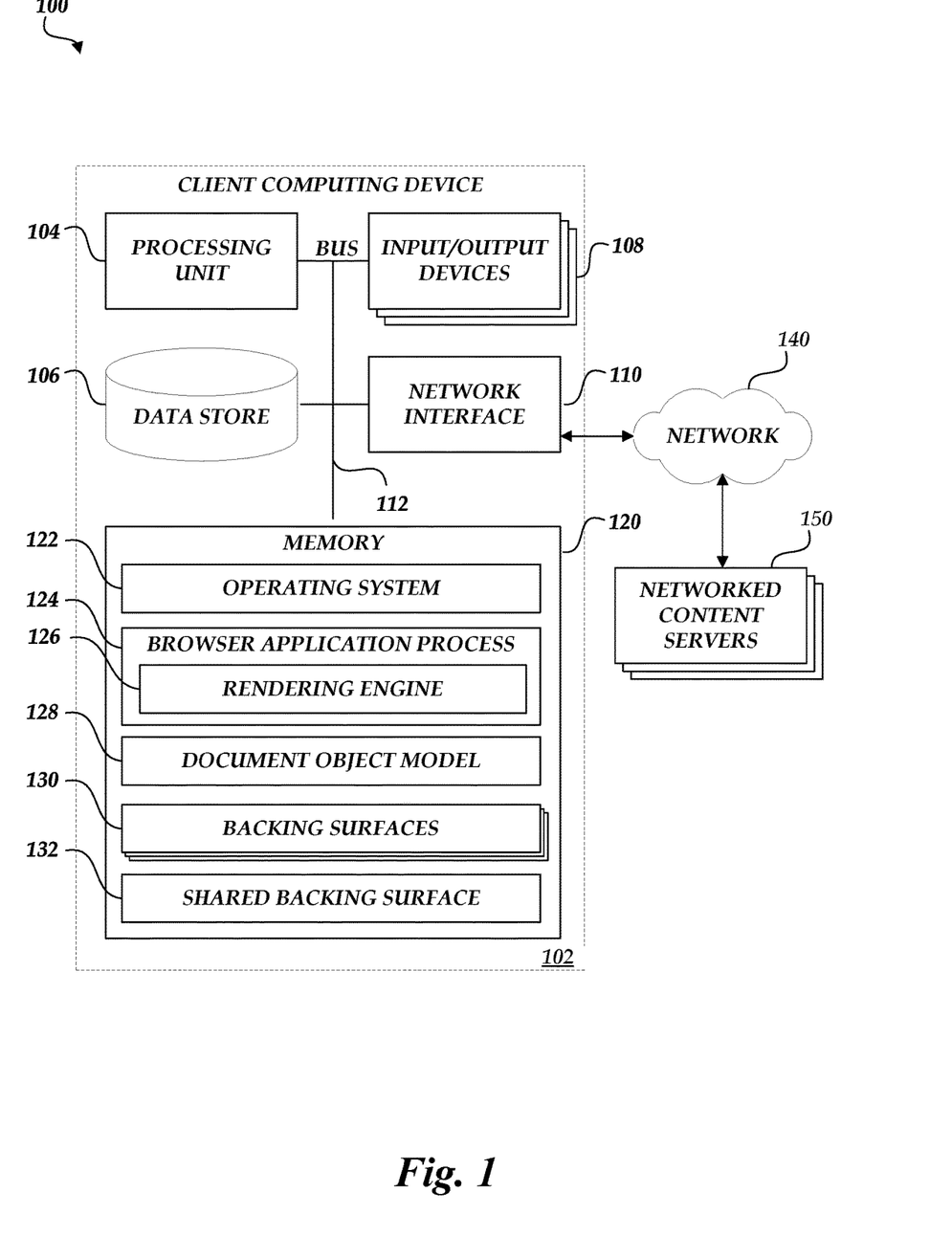
FIG. 1 is a schematic block diagram of an illustrative network topology including a browser application process executing on a client computing device and communicating with networked content servers via a network.

FIG. 1 is a block diagram illustrative of a networked computing environment 100 for rendering document content in accordance with the present disclosure. As illustrated in FIG. 1A, the networked computing environment 100 includes a client computing device 102 ("client") operable to request content from networked content servers 150 via a communications network 140. In an illustrative embodiment, the client 102 can correspond to a wide variety of computing devices including personal computing devices, laptop computing devices, hand-held computing devices, terminal computing devices, mobile devices (e.g., mobile phones, tablet computing devices, etc.), wireless devices, various electronic devices and appliances, and the like.

In an illustrative embodiment, the client 102 includes necessary hardware and software components for establishing communications over the communications network 140. For example, the client 102 may be equipped with a network interface 110 that facilitates communications via the network 140. The network 140 can be a publicly accessible network of linked networks, possibly operated by various distinct parties, such as the Internet. In other embodiments, the network 140 may include a private network, local area network ("LAN"), wide area network ("WAN"), cable network, satellite network, wireless telecommunications network, any other medium of computer data transfer, or some combination thereof.

The client 102 may also have varied local computing resources such as a central processing unit 104, data store 106, input/output devices 108, a bus interface 112, memory 120, and so forth. One skilled in the art will appreciate that the client 102 may have more or fewer components than those depicted in illustrative FIG. 1A. In an illustrative embodiment, memory 120 may contain inter alia an operating system 122 and a browser application process 124. In some embodiments, the browser application process 124 may include components such as a rendering engine 126, and may generate and maintain a document object model 128 for documents obtained from the networked content servers 150. In further embodiments, the rendering engine 126 may be implemented as a standalone process that communicates with the browser application process 124, a plug-in or manageable component of the browser application process 124, or as other software. The networked content servers 150 may illustratively be web servers configured to respond to requests from the browser application process 124 executing on the client 102.

The memory 120 of the client 102 may illustratively further contain one or more backing surfaces 130. As described above, the backing surfaces may be blocks of memory allocated by the rendering engine, and may be used by the rendering engine to represent all or part of a two-dimensional drawing space during the rendering of content. The memory 120 may further contain a shared backing surface 132, which may illustratively be one of the backing surfaces 130. In some embodiments, the memory 120 may contain multiple backing surfaces 130, as described in more detail below.

The modules or components illustrated in FIG. 1 may further include additional components, systems, and subsystems for facilitating the methods and processes. For example, in various embodiments, the client 102 may be centralized in one computing device, distributed across several computing devices, implemented by one or more virtual machine instances, or distributed through a network.

Figure 2A:
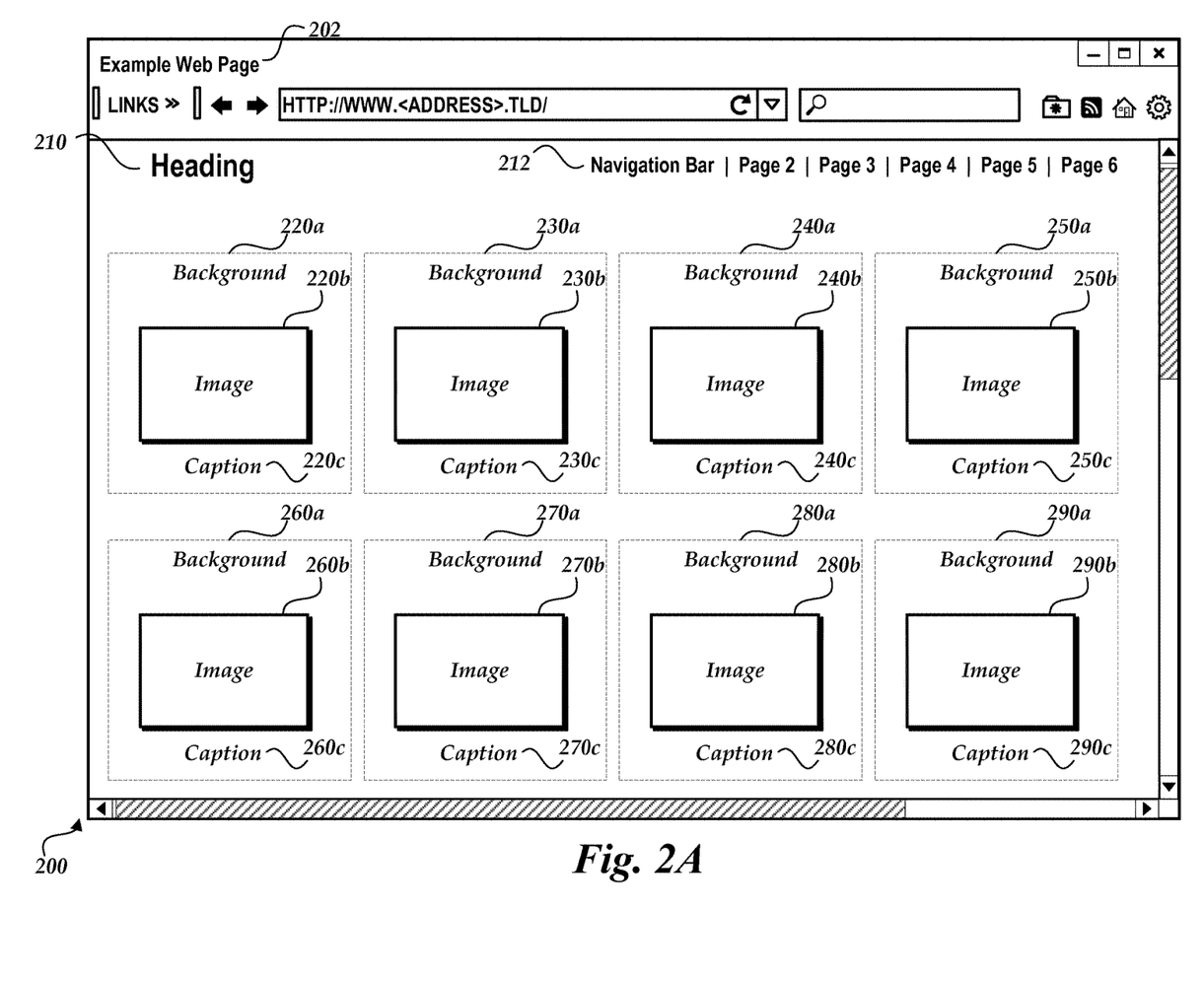
FIG. 2A is a pictorial diagram depicting an illustrative rendering of a document by the browser application process executing on the client computing device of FIG. 1.
Figure 3:
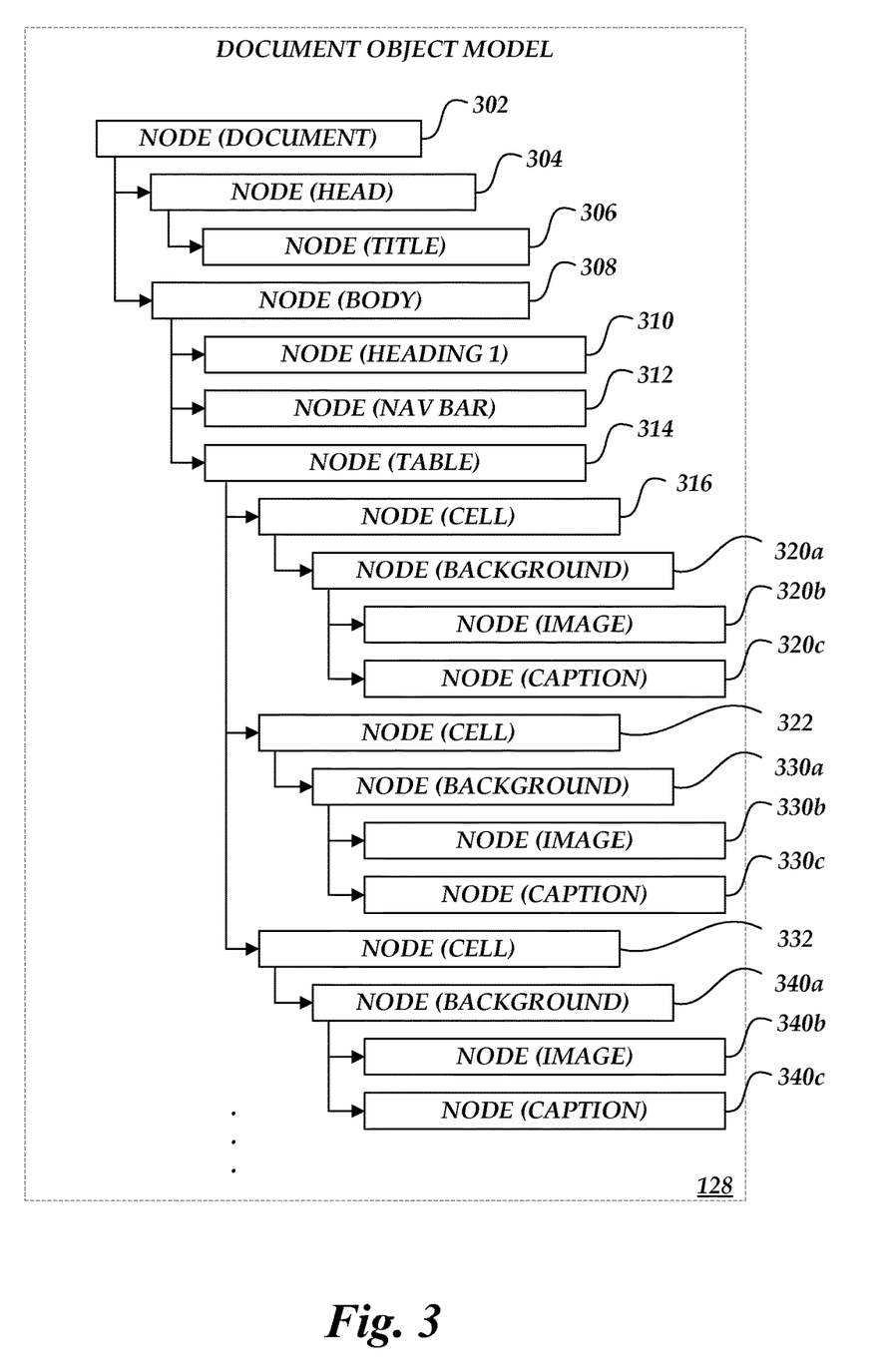
FIG. 3 is an illustrative block diagram of a document object model ("DOM") tree generated by the browser application process executing on the client computing device of FIG. 1.

With reference now to FIG. 2A, pictorial diagrams depicting an illustrative rendered document 200 will be described. The rendered document 200 may be output, for example, by the browser application process 124 executing on the client 102 of FIG. 1. FIG. 2A depicts a rendered document 200 including objects 202-290c that may correspond to, for example, elements of an HTML document or nodes in a DOM tree as depicted in FIG. 3. These objects may be rendered by a rendering engine 126, and may a title object 206, a heading object 210, a navigation bar 212, and a series of objects 220a-c, 230a-c, etc., that are repeated within the document. One skilled in the art will understand that the present disclosure is not limited to any particular document, rendering, script, or interaction, and that the embodiment depicted in FIG. 2A is illustrative rather than limiting.

Figure 2B:
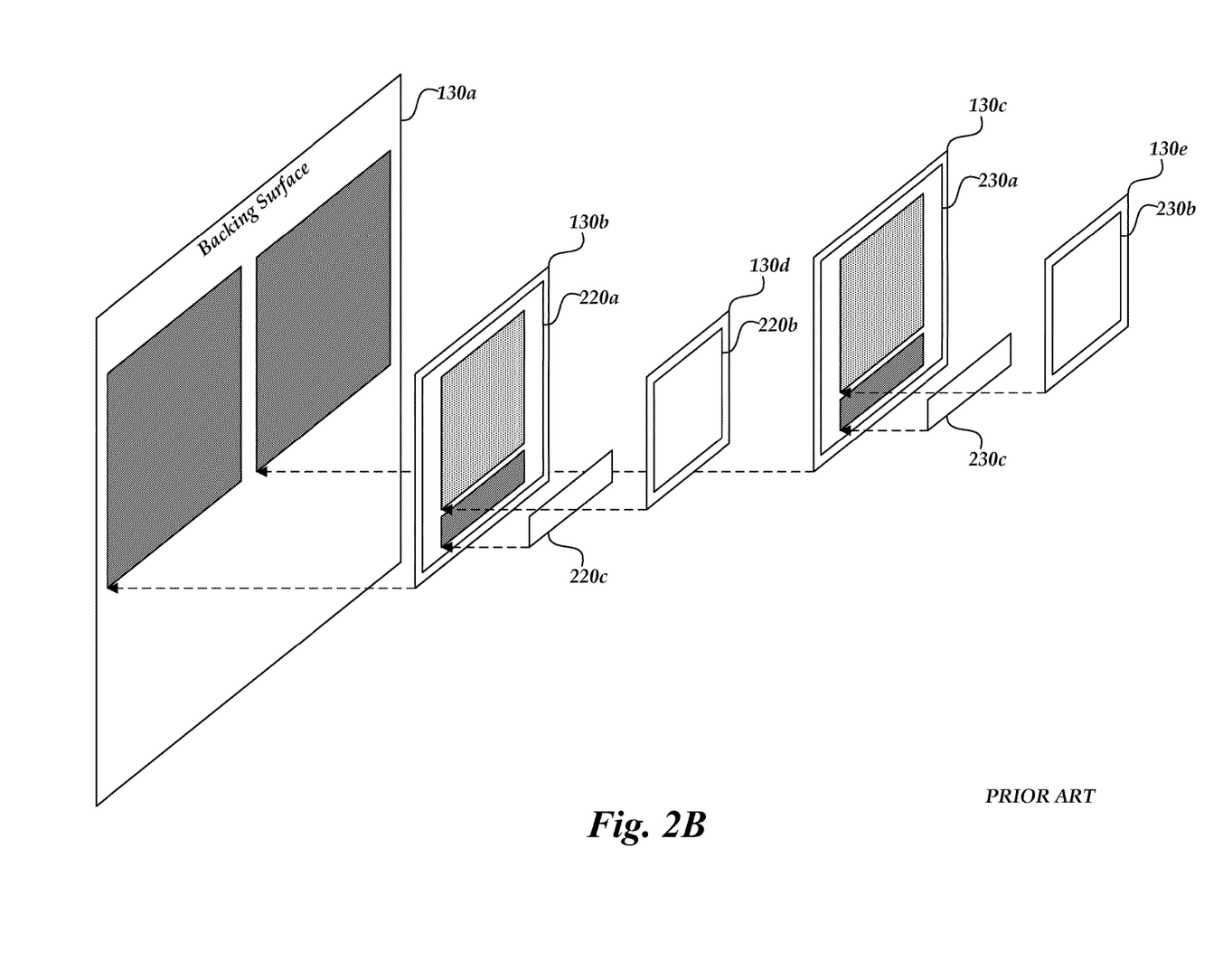
FIG. 2B is a pictorial diagram depicting rendering of nodes in a document object model to backing surfaces as performed by the prior art.

FIG. 2B depicts illustrative rendering of document objects to backing surfaces 130a-e as performed by the prior art. Objects 220a-c and 230a-c are as previously described with regard to FIG. 2A. In FIG. 2B, object 220b has specified a rendering property that requires its own backing surface 130d, and object 230b has similarly specified a rendering property that requires its own backing surface 130e. Objects 220a and 230a have further specified properties that require backing surfaces 130b and 130c respectively. Objects 220c and 230c do not require a separate backing surface, and are illustratively rendered onto the dark shaded areas of backing surfaces 130b and 130c respectively.

Once objects 220a-c and 230a-c have been rendered onto their respective backing surfaces, the backing surfaces are combined by the rendering engine. Illustratively, backing surfaces 130c and 130e may be combined to render the lightly shaded area of backing surface 130c, backing surfaces 130b and 130d may be combined to render the lightly shaded area of backing surface 130b, and backing surfaces 130b and 130d may be combined with backing surface 130a to render the shaded areas of backing surface 130*a*. Although not depicted in FIG. 2B, additional backing surfaces and combinations are required to render objects 240*a*-*c*, 250*a*-*c*, 260*a*-*c*, and so forth. Depending on the rendering properties of the various objects (e.g., transparency or rotation), the number of backing surfaces required to render the objects may rapidly proliferate.

Figure 2C:
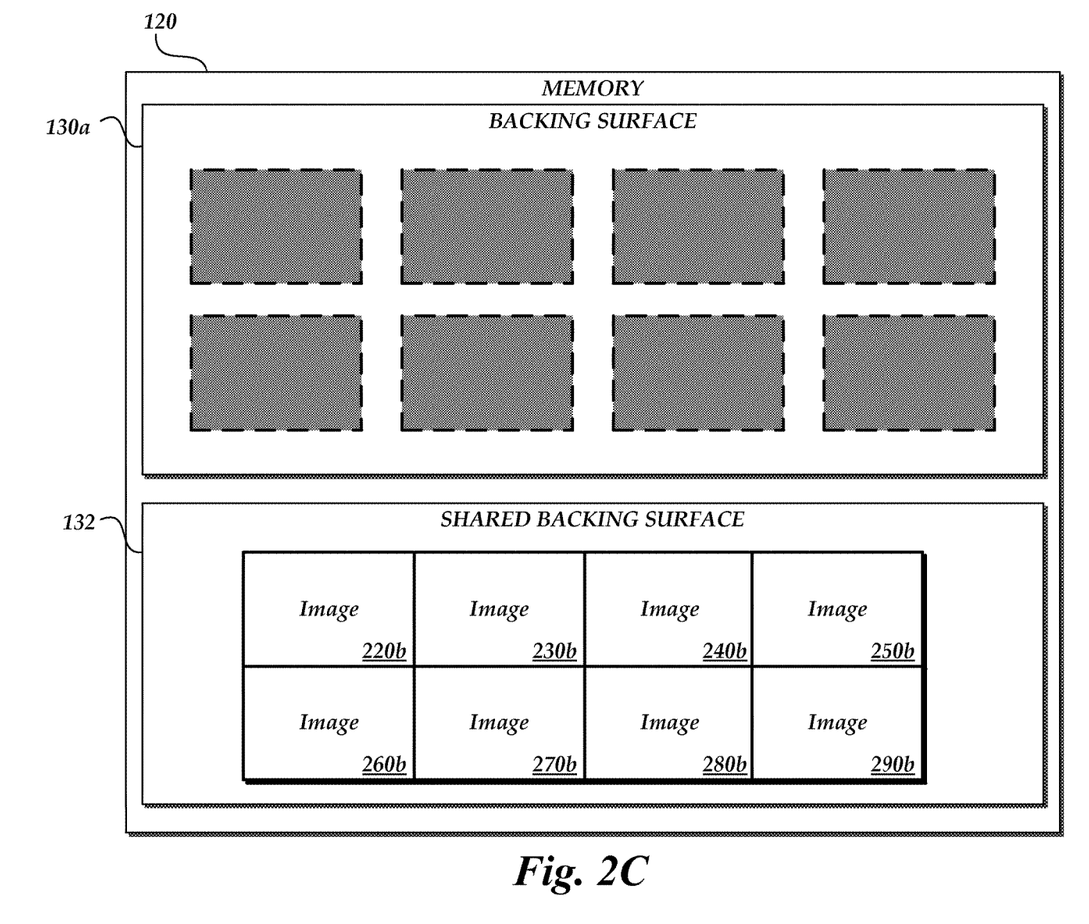
FIG. 2C is an illustrative block diagram of a shared backing surface in accordance with the present disclosure.

FIG. 2C depicts an illustrative block diagram of a backing surface 130*a* and a shared backing surface 132 in accordance with embodiments of the present disclosure. Objects 220*b*-290*b* are as previously described with regard to FIG. 2A. In FIG. 2C, objects 220*b*-290*b* are rendered to a shared backing surface 132, thereby reducing the number of separate backing surfaces required to render the objects. Each of the objects 220*b*-290*b* is rendered to a distinct region of the shared backing surface, and each object 220*b*-290*b* has its own coordinate translation function. Illustratively, object 220*b* may correspond to the first shaded region of backing surface 130*a*, object 230*b* may correspond to the second shaded region of backing surface 130*b*, and so forth. A coordinate translation function may, for example, map a particular coordinate on the shared backing surface for object 220*b* to a corresponding coordinate in the first shaded region of the backing surface 130*a*. Although not illustrated in FIG. 2C, aspects of the present disclosure include multiple shared backing surfaces. For example, a second shared backing surface may be provided for rendering objects 220*a*, 230*a*, 240*a*, and so forth, and the shared backing surfaces may be combined with each other or with conventional backing surfaces as needed.

With reference now to FIG. 3, a block diagram of a DOM tree 128, as depicted in FIG. 1, will be described. In FIG. 3, the DOM tree 128 illustratively includes nodes 302-340*c* organized in a hierarchical tree structure. The tree structure of the DOM 128 may correspond to, for example, the elements of an HTML document retrieved by the browser application process 124 from a networked content server 150. Further, all or some of nodes 302-340*c* may correspond to elements that are rendered visually in the document rendering 200 of FIG. 2A. For example, node 306 of FIG. 3A may correspond to the title 206 of FIG. 2A, node 310 of FIG. 3A may correspond to the heading 210 of FIG. 2A, and so forth. Other nodes, such as nodes 302, 304, and 308, may represent structure rather than displayable content.

In some embodiments, as described in more detail below, the DOM tree 128 may be analyzed to identify recurring branch structures. Such analysis may be performed by, for example, the rendering engine 126 of FIG. 1. Illustratively, the rendering engine 126 may analyze the DOM tree 128 to identify nodes 316, 322, and 332 as having a common branch structure containing one child node and two grandchild nodes. The rendering engine 126 may further analyze the DOM tree 128 to determine that the child nodes and grandchild nodes have similar rendering properties. For example, in some embodiments the rendering engine 126 may identify nodes 320*b*, 330*b*, and 340*b* as having a common transformation property, such as a filter or a perspective transformation. As will be explained in greater detail below, the rendering engine 126 can render the nodes having the identified common transformation property to a shared backing surface, and can apply the transformation to all nodes at once rather than rendering to several separate backing surfaces and transforming them one by one. In some embodiments, the rendering engine 126 may receive pre-computed analysis data rather than performing the analysis itself. For example, a proxy server may collect and cache analysis data from another client's rendering of the document, and may provide cached analysis data along with document content. As a further example, a server-side rendering engine may analyze the DOM tree 128 and provide analysis data to the rendering engine 126. Analysis data may include node identifiers, tree structures matching a subtree in the DOM tree 128, hash values, or rolling hash values generated from traversing a tree of drawing instructions, or other information.

Figure 4:
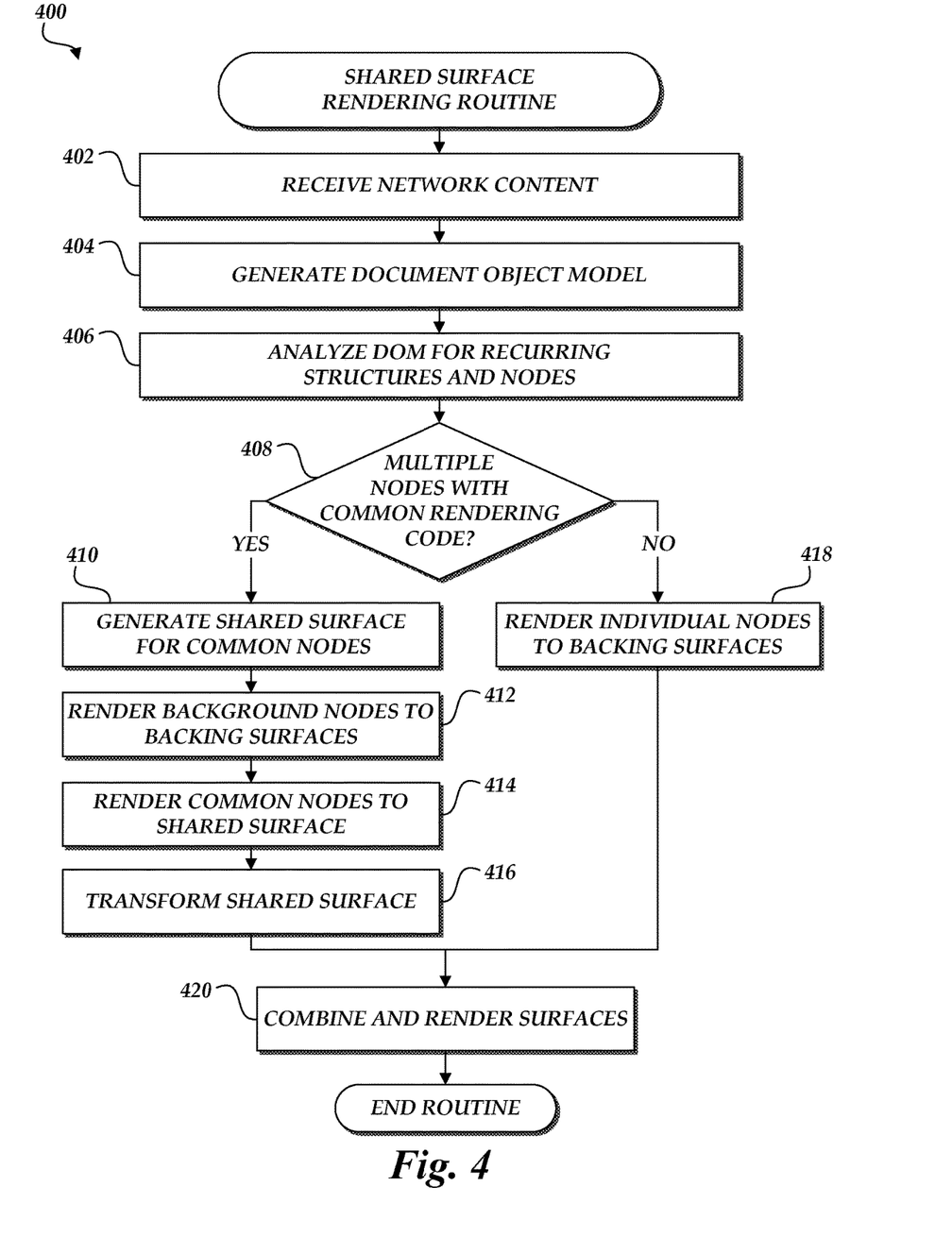
FIG. 4 is a flow diagram depicting an illustrative shared surface rendering routine implemented by the browser application process in accordance with the present disclosure.

With reference now to FIG. 4, an illustrative shared surface rendering routine 400 for rendering recurring elements to a shared backing surface will be described. The illustrative routine 400 may be carried out, for example, by the rendering engine 126 of FIG. 1, and may be carried out iteratively to render a number of groups of recurring elements.

At block 402, network content may be received for rendering. Illustratively, the network content may be received from a networked content server 150, and may include an HTML document, CSS style sheet, or other content that may be parsed and rendered by a rendering engine 126. Thereafter, at block 404, a document object model corresponding to the networked content may be generated. The DOM may illustratively be generated as a tree of nodes that each correspond to content items in the networked content, such as the exemplary DOM tree 128 depicted in FIG. 2. The routine 400 may further determine a rendering order for the nodes of the DOM tree 128, illustratively by analyzing node properties to determine which nodes should take precedence in the rendered output.

At block 406, the DOM tree may be analyzed to identify nodes for which a shared backing surface may facilitate rendering. The DOM tree may illustratively be analyzed with regard to the structure of branches in the tree, the properties of individual nodes, or other criteria. For example, the exemplary DOM tree 128 of FIG. 3 may be analyzed to identify that the branch structure of node 320*a* (i.e., that node 320*a* is the child of node 316 and the parent of nodes 320*b* and 320*c*) is replicated in blocks 330*a* and 340*a*. As a further example, image nodes 320*b*, 330*b*, and 340*c* may be analyzed to identify that these nodes all specify a 10° clockwise rotation in their rendering properties. In some embodiments, nodes may be analyzed to identify transformations that produce the same result when applied, such as a 10° clockwise rotation and a 350° counter-clockwise rotation. Although described herein with regard to image nodes, one skilled in the art will understand that filters, transformations, and other exclusory rendering properties may cause any node to require a separate backing surface.

Illustratively, the DOM tree may be analyzed by applying a filter function or pre-rendering analysis to each node. For example, a filter function may be a simplified drawing instruction generator that understands only a subset of drawing instructions, and may return properties such as instruction counts, time estimates, and required dependencies. The filter function may return a set of properties for each node, or may return a property set for a particular DOM tree branch to facilitate comparison to other branches. In some embodiments, properties returned by the filter function may be stored to a data structure, such as a dictionary of objects, with each object representing a set of nodes whose renderings may be combined and optimized. The dictionary may then be processed to filter the objects. For example, as described below, an object representing fewer than a threshold number of nodes may be excluded as unlikely to benefit from optimization. As a further example, nodes may be excluded if they correspond to previous optimization attempts (e.g., optimizations of a particular drawing instruction) that did not result in significant improvements. Still further, the dictionary may be processed to identify objects that may be combined, that contain overlapping sets of nodes. Further processing passes may combine filters or prioritize (e.g., by identifying larger optimizable sets).

At decision block 408, a determination is made as to whether the analysis at block 406 has identified a group of exclusory nodes that can share a backing surface. In some embodiments, the routine 400 may apply a threshold determination, such as a minimum number of exclusory nodes, as part of the determination of whether to utilize a shared backing surface. For example, a shared backing surface may be utilized only if the number of exclusory nodes exceeds 20 nodes. In some embodiments, the threshold number of nodes may be determined based on the rendering property. For example, a lower threshold (e.g., five nodes) may be determined with regard to a rendering property that requires significant computing resources to render, while a different threshold (e.g., 100 nodes) may be determined for nodes sharing a property that requires fewer computing resources to render. If the determination is made that a shared backing surface should be used, then the routine 400 branches to block 410, where a shared backing surface may be generated. Illustratively, the routine 400 may allocate a block of memory to serve as the shared backing surface, and may determine a size for the block of memory by determining and summing the storage requirements for the rendering of each exclusory node. The routine 400 may further determine the position of each exclusory node on the backing surface and a suitable coordinate translation function for relating the node's position on the shared backing surface to its position relative to other nodes on another backing surface. One skilled in the art will understand that the coordinate translation functions may be utilized to preserve spatial relationships between the exclusory nodes and other nodes as the backing surfaces are combined, and may be utilized to allow the shared backing surface to store the exclusory nodes without allocating additional memory.

At block 412, in some embodiments, nodes that precede the group of nodes in the rendering order may optionally be rendered to one or more "background" backing surfaces. Illustratively, nodes whose rendering is a component of rendering of the group of exclusory nodes may be rendered to a background backing surface. For example, one or more nodes may overlap the position of an exclusory node that specifies 50% opacity. The overlapping nodes may accordingly be rendered to a background backing surface prior to rendering the exclusory node, to facilitate applying the opacity effect. In some embodiments, multiple backing surfaces may be composited and combined in order to produce a suitable background for the shared backing surface. Further, in some embodiments, regions of the background backing surface may be copied to corresponding portions of the shared backing surface, using the reverse of the coordinate translation functions described above, to place appropriate background content at various positions on the shared backing surface.

At block 414, the exclusory nodes may be rendered to the shared backing surface. As described above, each node may correspond to a particular region or set of coordinates on the shared backing surface, which may be related to coordinates on a different backing surface by a translation function. Illustratively, in some embodiments, the shared backing surface may comprise a grid of spaces into which the exclusory nodes are rendered, as depicted in FIG. 2C, and the individual cells in the grid may correspond to separate spaces in the final composite content rendering, such as the spaces occupied by rendered objects 220b, 230b, and 240b in FIG. 2A.

In some embodiments, at block 416, a transformation may optionally be applied to the shared backing surface. Illustratively, a transformation may modify the rendered content by, for example, altering its color palette, applying a blur effect, or applying other filters. As further examples, the rendered content may be rotated about a 2D or virtual 3D axis with the results re-rendered accordingly. In some embodiments, a transformation may be applied by modifying the coordinate translation function (e.g., by changing the spatial relationship between the shared backing surface and other backing surfaces) rather than by directly modifying the content rendered to the shared backing surface. For example, a 90° clockwise rotation may be applied by changing the coordinate translation function to map the bottom left coordinate of the rendered exclusory node to the top left coordinate of a corresponding region on a parent backing surface, the top left coordinate of the exclusory node to the top right coordinate of its corresponding region, and so forth.

In further embodiments, the routine 400 may identify multiple transformations to apply to all or some of the exclusory nodes, and block 416 may be carried out iteratively on all or some exclusory nodes to apply the multiple transformations. Illustratively, a priority or ordering may be determined for the transformations, such as rendering a sepia tone before rendering a transparency effect, and the transformations may be interspersed with combining the shared backing surface with other backing surfaces. For example, a node may be rendered, transformed to grayscale, rotated, and then merged with a background backing surface at 70% opacity. As a further example, a node may be rendered, transformed, combined with a first backing surface, and then the first backing surface used as a background backing surface for other exclusory nodes.

If the determination at decision block 408 is that a shared background surface is not required, then the routine 400 branches to block 418 where nodes may be conventionally rendered to one or more backing surfaces. In some embodiments, decision block 408 may be carried out on a node-by-node basis, with each node receiving either conventional rendering at block 418 or rendering to a shared backing surface at block 414.

Thereafter, at block 420, backing surfaces (including the shared backing surface) may be combined to produce a composite presentation of the networked content. As described above, the shared backing surface may be combined with other backing surfaces by using coordinate translation functions to place the exclusory nodes at their corresponding positions on the parent or background backing surface. In some embodiments, conventional backing surfaces may be combined at blocks 412 or 418 to "sandwich" the shared backing surface between a composite rendering of foreground content and a composite rendering of background content, and the combination of blocking surfaces at block 420 may thus consolidate the number of transformations performed by the rendering engine.

One skilled in the art will appreciate that the routine 400 depicted in FIG. 4 is illustrative rather than limiting, and that the present disclosure includes several embodiments with more or fewer elements than the illustrated routine 400. As an example, block 410 may be omitted, and the exclusory nodes may be rendered and transformed without the use of a shared backing surface. As a further example, nodes may be identified as having common rendering properties without reference to their positions in the DOM tree, and may instead be identified based on their Z-ordering. As a still further example, nodes may be identified as utilizing certain rendering engine commands or routines, rather than being identified as specifying particular styles or properties. For example, the rendering engine may determine that multiple styles or properties all invoke a particular feature of the rendering engine during rendering, and may identify nodes on the basis of invoking that feature rather than identifying nodes that specify a particular CSS property.

Still further, in some embodiments, the routine 400 may be implemented as a "greedy" algorithm that generates false positives. Illustratively, the determination at decision block 408 may not be accurate, and may sometimes identify a group of nodes whose dependencies actually prevent them from being rendered as a group. In these embodiments, the routine 400 may include elements to detect and correct this condition. For example, the rendering engine may disregard the optimization instructions, remove some or all nodes from the group, delay rendering of some nodes, or allow output that temporarily violates the dependencies. In further embodiments, the routine 400 may identify a particular optimization associated with the conflicted group of nodes, and may defer or prevent further attempts to perform this optimization (e.g., by waiting a number of rendering passes before attempting the optimization again). The routine 400 may further generate metrics or store analysis data relating to the misidentified group of nodes, which may be used to adjust, for example, the analysis performed at block 406 or the determination made at block 408.

Figure 5:
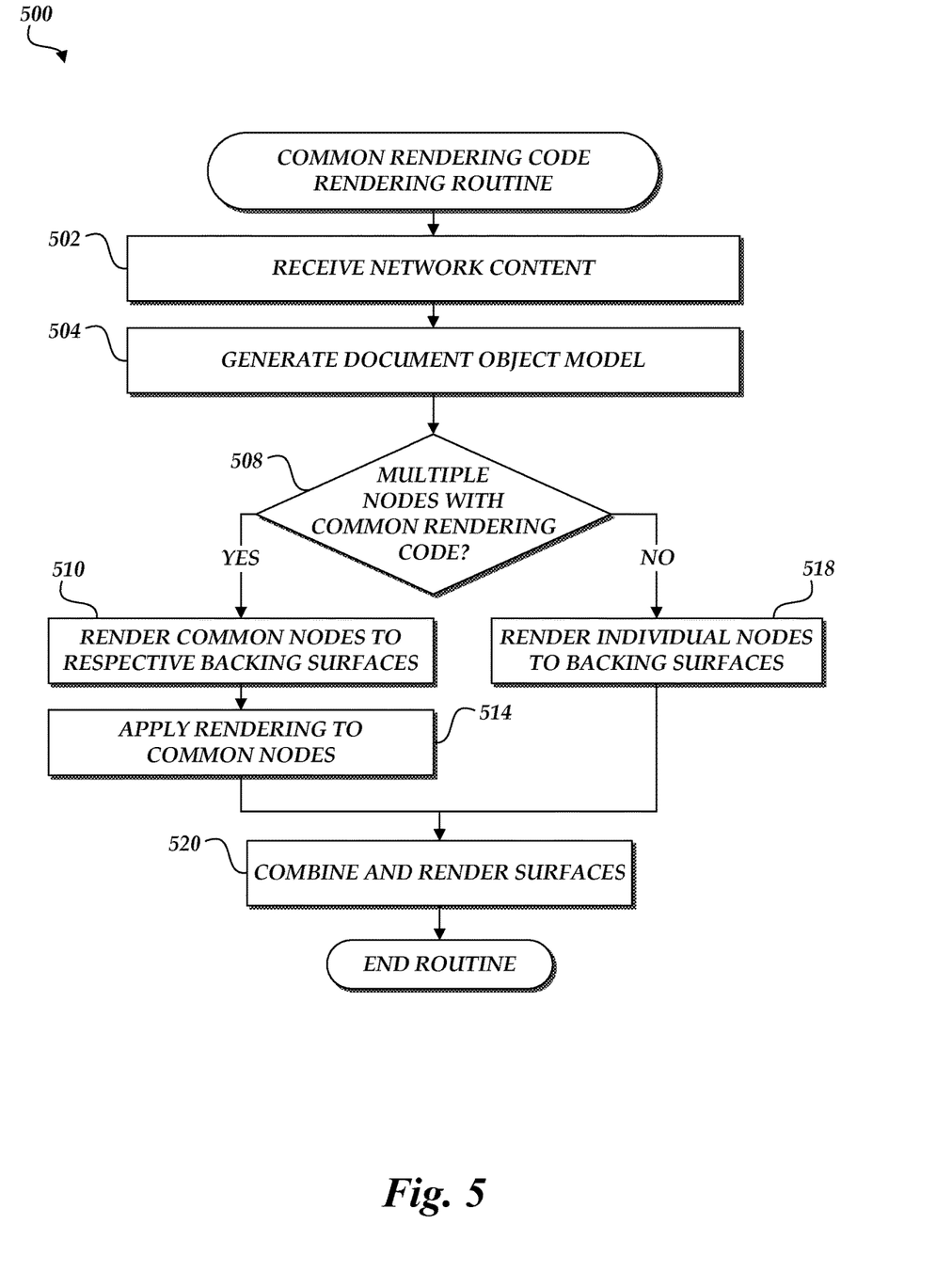
FIG. 5 is a flow diagram depicting an illustrative shared drawing code rendering routine implemented by the browser application process in accordance with the present disclosure.

With reference now to FIG. 5, an illustrative shared drawing code rendering routine 500 for rendering elements that utilize common rendering code will be described. The illustrative routine 500 may be carried out, for example, by the rendering engine 126 of FIG. 1, and may be carried out iteratively to render a number of groups utilizing common rendering code. At block 502, network content may be received for rendering, and at block 504 a document object model may be generated. Illustratively, blocks 502 and 504 of routine 500 correspond to blocks 402 and 404 of routine 400.

At decision block 508, a determination is made as to whether a group of DOM nodes can be identified that utilize common rendering code. Illustratively, as described above, DOM nodes that utilize common rendering code may be identified using a filter function, such as a simplified drawing instruction generator, or may be identified based on common properties or styles.

If a group of nodes utilizing common rendering code can be identified, then the routine 500 branches to block 510, where the nodes may be partially rendered to their respective backing surfaces. Thereafter, at block 514, the common rendering code may be invoked and applied to the common nodes. Illustratively, the common rendering code may be a transformation, such as a 3D perspective change, that can be invoked one time and applied to several nodes. In some embodiments, depending on the common rendering code, blocks 510 and 514 may be combined, block 510 may be omitted, or block 510 may precede block 514.

If nodes utilizing common rendering code cannot be identified, then the routine 500 branches to block 518, where the nodes of the DOM may be rendered conventionally. Thereafter, at block 520, node backing surfaces may be combined and rendered to produce a composite presentation. Blocks 518 and 520 correspond to blocks 418 and 420 of FIG. 4, as described above.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules and method elements described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g." and the like, unless specifically stated otherwise, or otherwise understood within the context as used, is generally intended to convey that certain embodiments include, while other embodiments do not include, certain features, elements or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment. The terms "comprising," "including," "having," "involving" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system comprising:
   a data store configured to store computer-executable instructions; and
   a processor in communication with the data store, the processor, when executing the computer-executable instructions, configured to:
   receive a document comprising a plurality of objects;
   generate a document object model based at least partly on the document, wherein the document object model comprises a tree structure having a plurality of nodes, and wherein individual nodes of the plurality of nodes correspond to respective objects of the plurality of objects;
   identify an exclusory rendering property shared by at least a first and second node of the plurality of nodes, wherein the exclusory rendering property specifies a transformation to be applied to each of the first node and the second node;
   determine, based at least in part on the tree structure, that each of the first node and the second node can be rendered without rendering the other node first;
   in response to the determination, generate a shared memory block, the shared memory block comprising a first set of coordinates corresponding to the first node and a second set of coordinates corresponding to the second node;
   render the first node to the first set of coordinates of the shared memory block;
   render the second node to the second set of coordinates of the shared memory block;
   render the shared memory block to a composited memory block to form rendered document content; and
   cause display of the rendered document content on a client computing device.

2. The system of claim 1, wherein the exclusory rendering property comprises at least one of a 3D transformation, a perspective transformation, an animation, an opacity, a filter, a video, a context, or a plugin.

3. The system of claim 1, wherein the processor configured to render the shared memory block to a composited memory block to form rendered document content is configured to:
   map the first set of coordinates to a first region of the composited memory blocks;
   map the second set of coordinates to a second region of the composited memory block;
   render the first set of coordinates to the first region; and
   render the second set of coordinates to the second region.

4. The system of claim 1, wherein the processor is further configured to apply the transformation to the shared memory block.

5. A method comprising:
   receiving network content comprising a plurality of objects;
   generating a document object model based at least partly on the plurality of objects, wherein the document object model comprises a tree structure having a plurality of nodes, and wherein individual nodes of the plurality of nodes correspond to respective objects of the plurality of objects;
   identifying a plurality of exclusory nodes, wherein each node of the plurality of exclusory nodes specifies an exclusory rendering property;
   determining that each node of the plurality of exclusory nodes can be rendered without requiring that any other node of the plurality of exclusory nodes be rendered first;
   in response to the determination, rendering the plurality of exclusory nodes to a shared memory block;
   generating rendered network content based at least in part on the shared memory block; and
   causing display of the rendered network content on a client computing device.

6. The method of claim 5, wherein the exclusory rendering property specifies a transformation, and wherein the method further comprises applying the transformation to the shared memory block.

7. The method of claim 6, wherein the exclusory rendering property specifies a filter, and wherein the method further comprises applying the filter to the shared memory block.

8. The method of claim 5, wherein the shared memory block comprises a respective set of coordinates for each of the plurality of exclusory nodes.

9. The method of claim 8, wherein rendering each of the plurality of exclusory nodes to the shared memory block comprises rendering each of the plurality of exclusory nodes to the respective set of coordinates.

10. The method of claim 9, wherein generating rendered network content based at least in part on the shared memory block comprises rendering the each of the respective sets of coordinates of the shared memory block to a corresponding region of a composite memory block.

11. The method of claim 8 further comprising:
- determining a rendering order of the plurality of nodes, wherein the rendering order comprises an order in which nodes are to be rendered to a composite memory block;
- identifying, for each of the plurality of exclusory nodes, a respective one or more preceding nodes of the plurality of nodes, wherein the respective one or more preceding nodes are associated with the exclusory node, and wherein the respective one or more preceding nodes precede the exclusory node in the rendering order; and
- rendering the respective one or more preceding nodes for each of the plurality of exclusory nodes.

12. The method of claim 11, wherein rendering the shared memory block to the composite memory block comprises:
- rendering the respective set of coordinates for each of the plurality of exclusory nodes to a respective corresponding region of a background memory block; and
- rendering the background memory block to the composite memory block.

13. A non-transitory computer-readable storage medium including computer-executable instructions that, when executed by a processor, cause the processor to:
- generate a document object model based at least partly on a plurality of objects defined according to network content to be rendered, wherein the document object model comprises a tree structure having a plurality of nodes;
- determine, for each node of the plurality of nodes, a respective set of dependent nodes, wherein rendering each node of the plurality of nodes is dependent on rendering the respective set of dependent nodes;
- determine a rendering order for the plurality of nodes based at least in part on the respective set of dependent nodes for each node of the plurality of nodes;
- identify a plurality of exclusory nodes within the plurality of nodes, wherein each of the plurality of exclusory nodes is associated with a first exclusory rendering property;
- determine, based on the rendering order, that a first subset of the plurality of exclusory nodes can be rendered in any order relative to each other; and
- in response to the determination, render the first subset of the plurality of exclusory nodes to a shared memory block.

14. The non-transitory computer-readable storage medium of claim 13, wherein the first exclusory rendering property comprises a transformation, and wherein the computer-executable instructions further cause the processor to apply the transformation to the first subset of the plurality of exclusory nodes.

15. The non-transitory computer-readable storage medium of claim 14, wherein the computer-executable instructions further cause the processor to:
- identify a second subset of the first subset of the plurality of exclusory nodes, wherein each of the second subset is associated with a second exclusory rendering property, and wherein the second exclusory rendering property comprises a second transformation; and
- apply the second transformation to the second subset.

16. The non-transitory computer-readable storage medium of claim 13, wherein the first exclusory rendering property comprises an opacity, and wherein the computer-executable instructions further cause the processor to:
- identify, for at least one exclusory node of the first subset of the plurality of exclusory nodes, a background subset of the plurality of nodes, the background subset comprising one or more nodes that precede at least one exclusory node in the rendering order, wherein each node of the background subset is associated with the at least one exclusory node;
- render the background subset to a background memory block; and
- render the at least one exclusory node to the background memory block.

17. The non-transitory computer-readable storage medium of claim 16, wherein the computer-executable instructions further cause the processor to combine the shared memory block with the background memory block.

18. The non-transitory computer-readable storage medium of claim 13, wherein the computer-executable instructions further cause the processor to generate a respective coordinate translation function for each of the plurality of exclusory nodes.

19. The non-transitory computer-readable storage medium of claim 13, wherein the computer-executable instructions that cause the processor to identify a plurality of exclusory nodes cause the processor to identify at least a threshold number of exclusory nodes.

* * * * *